(12) United States Patent
Toyozawa et al.

(10) Patent No.: US 7,071,651 B2
(45) Date of Patent: Jul. 4, 2006

(54) POSITION-OF-MAGNETIC-POLE DETECTING DEVICE AND METHOD

(75) Inventors: Yukio Toyozawa, Kumamoto (JP); Naoto Sonoda, Kumamoto (JP)

(73) Assignee: Fanuc LTD, Yamanashi (JP)

( * ) Notice: Subject to any disclaimer, the term of this patent is extended or adjusted under 35 U.S.C. 154(b) by 0 days.

(21) Appl. No.: 10/969,176

(22) Filed: Oct. 21, 2004

(65) Prior Publication Data

US 2005/0110452 A1 May 26, 2005

(30) Foreign Application Priority Data

Oct. 22, 2003 (JP) ............................. 2003-362379

(51) Int. Cl.
*H02P 5/28* (2006.01)
(52) U.S. Cl. ....................... 318/807; 318/801
(58) Field of Classification Search ................ 318/807, 318/801, 700, 724, 279
See application file for complete search history.

(56) References Cited

U.S. PATENT DOCUMENTS

| 5,914,582 A * | 6/1999 | Takamoto et al. .......... 318/801 |
| 2004/0012367 A1* | 1/2004 | Takahashi et al. .......... 318/807 |
| 2004/0178762 A1* | 9/2004 | Manaka ...................... 318/685 |

FOREIGN PATENT DOCUMENTS

| JP | 8-9681 | 1/1996 |
| JP | 10-285989 | 10/1998 |
| JP | 2000-312493 | 11/2000 |
| JP | 2002/84783 | 3/2002 |
| JP | 3312472 | 5/2002 |
| JP | 3312520 | 5/2002 |
| JP | 2002-171798 | 6/2002 |

* cited by examiner

*Primary Examiner*—Karen Masih
(74) *Attorney, Agent, or Firm*—Drinker Biddle & Reath LLP (57) ABSTRACT

A high-frequency voltage whose amplitude is small is applied as a d-phase command voltage, and an excitation phase is changed to a predetermined degree at predetermined intervals, whereby a motor is driven. As the d-phase command voltage has the small amplitude and high frequency, the rotor of the motor does not rotate. A d-phase feed back current is detected, and the product of a derivative of the d-phase feed back current by the high-frequency voltage command is calculated. A high-frequency component is removed from the product. An excitation phase (direction of a magnetic flux) associated with a deviation of 0 or $\pi$ from the position of a magnetic flux and also associated with a peak value assumed by the product having the high-frequency component removed therefrom is detected. A plurality of thus detected excitation phases is averaged in order to determine the direction of a magnetic flux. The excitation phase associated with one of two peak values assumed by the product is adopted on a fixed basis. Positive and negative rectangular waves having a magnitude causing magnetic saturation are applied as d-phase voltage commands. The polarity of a magnetic pole is determined based on positive and negative d-phase feed back currents. As the direction of a magnetic flux and the polarity thereof are detected separately from each other, the position of a magnetic pole can be detected accurately and reliably.

34 Claims, 5 Drawing Sheets

POSITION-OF-MAGNETIC-POLE DETECTING DEVICE AND METHOD

BACKGROUND OF THE INVENTION

1. Field of the Invention

The present invention relates to detection of the position of a magnetic pole in a rotor included in a synchronous motor, or the like, employing a permanent magnet.

2. Description of the Related Art

In a synchronous motor or a reluctance motor, a desired torque must be generated by causing a current to flow through phase windings according to the position of a magnetic pole in a rotor. The position of a magnetic pole in the rotor is therefore detected using an encoder or another sensor, so that the current will flow in the direction of an appropriate excitation phase. For this purpose, the position of a magnetic pole is detected at the time of starting up a motor in order to obviate the employment of a sensor having absolute values set therein for detection of the position of a magnetic pole or the work of aligning a sensor with a magnetic pole.

Moreover, as methods for detecting the position of a magnetic pole without employment of a sensor, there are methods including the one disclosed in, for example, Japanese Patent No. 3312520. According to the methods, a change in a ripple of an output of an inverter provided during each switching time under the control of a pulse-width modulator (PWM), or a change in an integrated value calculated by integrating values of an output voltage during the time is detected synchronously with the switching of the states of the inverter. The coordinates representing the position of a rotor are used to calculate the position of a magnetic pole according to a current-voltage equation relevant to a motor.

Moreover, according to methods including the one disclosed in Japanese Patent No. 3312472, an alternating voltage is applied to a motor, a detected current flowing through the motor is decomposed into a component parallel to the applied alternating voltage and a component orthogonal thereto, and the position of a magnetic pole is detected based on either of the parallel and orthogonal components.

Moreover, according to known methods including the one disclosed in Japanese Unexamined Patent Application Publication No. 2002-171798, a high-frequency voltage is superimposed on a direct-axis (d-axis) reference-wave voltage command, and the resultant direct-axis (d-axis) voltage command is transferred in order to decompose a current, which flows through an armature, into a direct-axis (d-axis) current and a quadrature-axis (q-axis) current. A high-frequency current whose frequency is identical to the frequency of the high-frequency voltage is sampled from the quadrature-axis (q-axis) current. The high-frequency current is used to calculate an estimated speed of a rotor and a first estimated position thereof. While the estimated speed and first estimated position are being calculated, pulsating voltages of positive and negative polarities are superimposed on the high-frequency voltage. Change rates, at which the direct-axis (d-axis) current changes along with superimpositions of positive and negative pulses, are used to calculate a second estimated position, that is, the position of a magnetic pole.

Furthermore, according to known methods including the one disclosed in Japanese Unexamined Patent Application Publication No. 2000-312493, the fact that an inductance decreases due to magnetic saturation is utilized in order to detect a d-axis current by applying positive and negative voltages of a certain level, which are regarded as vectors, to a motor by changing an angle at regular intervals. The initial point, of the vectors of the positive and negative voltages producing currents whose difference is the largest, is estimated as the position of a magnetic pole.

The foregoing methods of the related arts have a drawback that the position of a magnetic pole cannot be defected readily and accurately.

SUMMARY OF THE INVENTION

Accordingly, an object of the present invention is to provide a device and method for detecting the position of a magnetic pole at the time of starting up a motor for the purpose of correcting a deviation of a sensor-mounted position from the position of the magnetic pole. More particularly, the present invention is concerned with a position-of-magnetic-pole detecting device and method for readily and accurately detecting the position of a magnetic pole (position of a rotor).

In order to accomplish the above object, the present invention provides a position-of-magnetic-pole detecting device for detecting the position of a magnetic pole at the time of starting up a motor of a salient-pole type. The position-of-magnetic-pole detecting device comprises: a direction-of-magnetic-pole detecting means for detecting the direction of a magnetic pole on the basis of a feed back current of a driving current flowing through the motor which is returned after a high-frequency voltage is applied to the motor in order to drive the motor while an excitation phase is changed, the high-frequency voltage, and the excitation phase; and a polarity-of-magnetic-pole acquiring means for detecting the polarity of a magnetic pole on the basis of the peak values of the feed back currents of positive and negative driving currents flowing through the motor which are returned after positive and negative rectangular-wave voltages are applied to the motor in order to drive the motor with an excitation phase fixed to the direction of a magnetic pole detected by the direction-of-magnetic-pole detecting means.

According to the first aspect of the present invention, there is provided a position-of-magnetic-pole detecting device for detecting the position of a magnetic pole at the time of starting up a motor of a salient-pole type comprising: a high-frequency voltage applying means for applying a high-frequency voltage to the motor; an excitation phase changing means for changing an excitation phase to an arbitrary phase; a driving current detecting means for detecting a feed back current of a driving current, which flows through the motor, after the high-frequency voltage applying means applies a high-frequency voltage to the motor in the direction of the arbitrary excitation phase; a direction-of-magnetic-pole detecting means for detecting the direction of a magnetic pole on the basis of the high-frequency voltage applied by the high-frequency voltage applying means, the arbitrary excitation phase, and the feed back current of the driving current detected by the driving current detecting means; a rectangular-wave voltage applying means for applying positive and negative rectangular-wave voltages with the excitation phase fixed to the direction of a magnetic pole detected by the direction-of-magnetic-pole detecting means; a peak current detecting means for detecting the peak values of the feed back currents of driving currents flowing through the motor which are returned after the positive and negative rectangular-wave voltages are applied; and a polarity-of-magnetic-pole acquiring means for detecting the polarity of a magnetic pole on the basis of the feed back currents of the positive and negative driving currents.

According to the second aspect of the present invention, there is provided a position-of-magnetic-pole detecting device for motors of a salient-pole type comprising: a high-frequency voltage applying means for applying a high-frequency voltage to the motor; a driving current detecting means for detecting a feed back current of a driving current, which flows through the motor, after the high-frequency voltage applying means applies the high-frequency voltage to the motor while an excitation phase is changed; a means for calculating the product of a derivative of the feed back current of a driving current, which is detected by the driving current detecting means, by the high-frequency voltage; a filter means for removing a high-frequency component from the product of the derivative of the feed back current of a driving current by the high-frequency voltage; a direction-of-magnetic-pole detecting means for detecting the direction of a magnetic pole by acquiring from an output of the filter means a peak value assumed by the product of the derivative of the feed back current of a driving current by the high-frequency voltage; a rectangular-wave voltage applying means for driving the motor by applying positive and negative rectangular-wave voltages, which have a magnitude causing magnetic saturation, with an excitation phase fixed to the direction of a magnetic pole detected by the direction-of-magnetic-pole detecting means; a peak current detecting means for detecting the peak values of the feed back currents of driving currents returned after the positive and negative rectangular-wave voltages are applied the motor in order to drive the motor; and a polarity-of-magnetic-pole acquiring means for acquiring the polarity of a magnetic pole on the basis of the feed back currents of the positive and negative driving currents.

According to the third aspect of the present invention, there is provided a position-of-magnetic-pole detecting method for motors of a salient-pole type. The position-of-magnetic-pole detecting method comprises the steps of: applying a high-frequency voltage to the motor while changing an excitation phase; detecting a feed back current of a driving current flowing through the motor; calculating the product of a derivative of the feed back current of a driving current by the high-frequency voltage; removing a high-frequency component from the product using a filter; detecting the direction of a magnetic pole on the basis of a peak value that is assumed by the product of the derivative of the feed back current of a driving current by the high-frequency voltage and that is obtained by removing the high-frequency component from the product; driving the motor by applying positive and negative rectangular-wave voltages, which have a magnitude causing magnetic saturation, with an excitation phase fixed to the detected direction of a magnetic pole; detecting the peak values of feed back currents of driving currents; and detecting the polarity of a magnetic pole on the basis of the peak values of the feed back currents of positive and negative driving currents.

Moreover, the rectangular wave to be applied by the rectangular-wave voltage applying means may be provided as a d-phase voltage command. Moreover, the driving current detecting means may convert the feed back current, which is detected while an excitation phase is changed to a predetermined electrical angle, into a dq-phase current, and then detect a d-phase current component of the feed back current having been converted into the dq-phase current. The peak current detecting means may convert each of the feed back currents into a dq-phase current, and detect the peak value of a d-phase current component of the feed back current having been converted into the dq-phase current. Moreover, the direction-of-magnetic-pole detecting means may detect a plurality of peak values assumed by the product of the derivative of the feed back current of a driving current by the high-frequency voltage, and average the peak values so as to specify the position of a magnetic pole. Moreover, the polarity-of-magnetic-pole acquiring means may integrate each of pluralities of positive and negative peak values detected by the peak current detecting means, and determine the polarity of a magnetic pole according to the integrated values.

It should be note that the terms employed in claims are not limited to specific meanings adapted to an embodiment.

BRIEF DESCRIPTION OF THE DRAWINGS

The present invention will be more clearly understood by referencing the following appended drawings.

DETAILED DESCRIPTION

The structure of a rotor included in a permanent-magnet synchronous motor falls broadly into a surface permanent magnet (SPM) type in which a permanent magnet is bonded to the surface of a rotor, and an interior permanent magnet (IPM) type in which a permanent magnet is embedded in a rotor. In general, the SPM motor is of a non-salient pole type in which a d-axis inductance and a q-axis inductance that are offered by phase windings on an armature are equal to each other, while the IPM motor is of a salient-pole type in which the d-axis and q-axis inductances are different from each other.

According to the present invention, the property of the salient-pole type IPM motor that the inductances offered by the phase windings are functions of an electrical angle is utilized in order to detect a magnetic pole. The phenomenon that after magnetic saturation occurs, a response in a current varies depending on a direction in which the current flows is utilized in order to check the polarity of the magnetic pole.

Figure 1:
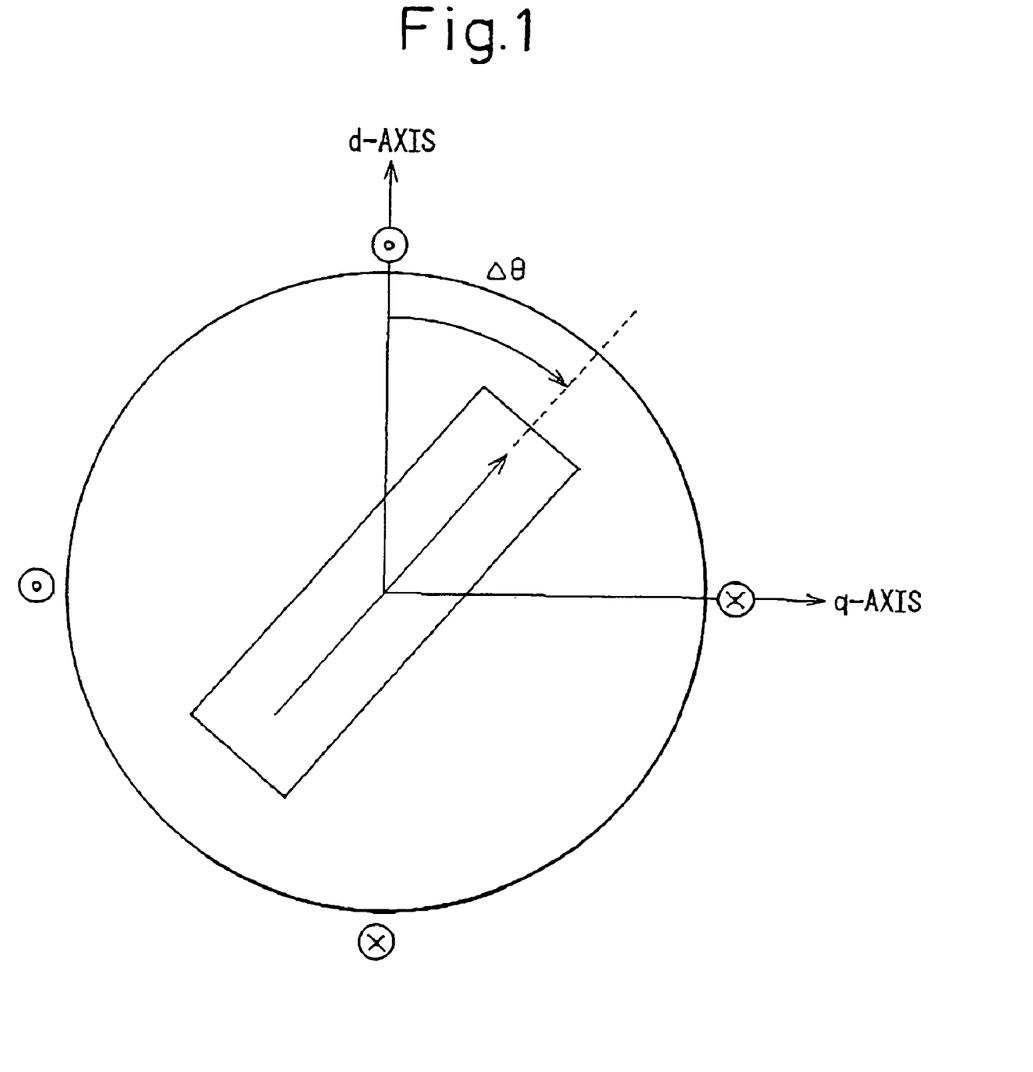
FIG. 1 is an explanatory diagram concerning a d-axis of a dq coordinate system and a deviation of the position of a magnetic pole.

If a magnetic flux $(\lambda_d, \lambda_q)$ is defined in a dq coordinate system associated with a salient-pole type motor including two phase windings, a deviation of a rotor (magnetic pole) from a d-axis is, as shown in FIG. 1, a deviation $\Delta\theta$, the magnetic flux $(\lambda_d, \lambda_q)$ is expressed as a function of the deviation $\Delta\theta$ according to the following formulae (1-1) and (1-2):

$$\lambda_d = (L_0 + L_2 \cos 2\Delta\theta) \cdot i_d - L_2 \sin 2\Delta\theta \cdot i_q + \phi \cos \Delta\theta \quad (1m\text{-}1)$$

$$\lambda_q = -L_2 \sin 2\Delta\theta \cdot i_d + (L_0 - L_2 \cos 2\Delta\theta) \cdot i_q - \phi \sin \Delta\theta \quad (1\text{-}2)$$

where $L_0$ denotes an average inductance independent of an excitation phase, and $L_2$ denotes a variation inductance dependent on the excitation phase. If the d-axis inductance offered by one phase winding is $L_d$ and the q-axis inductance offered by one phase winding is $L_q$, $L_d$ is provided as $L_d = L_0 + L_2$ and $L_q$ is provided as $L_q = L_0 - L_2$, in the case of an IPM motor, since the IPM motor is of a non-salient pole type, the relationship of $L_2<0$ and $L_q>L_d$ are established. In the formulae (1-1) and (1-2), φ denotes a magnetic flux induced by a magnet.

Using the d-coordinate and q-coordinate, a voltage $V_{dq}$ (a synthetic voltage of a d-axis voltage component and a q-axis voltage component) is provided by the following formula (2):

$$V_{dq} = Rs \cdot i_{dq} + d/dt(\lambda_{dq}) + \omega \pi \lambda_{dq} \qquad (2)$$

where Rs denotes a resistance offered by the phase windings on the armature, $\lambda_{dq}$ denotes a synthetic magnetic flux of a d-axis magnetic flux and a q-axis magnetic flux, $i_{dq}$ denotes a synthetic current of a d-axis current and a q-axis current, and ω denotes an angular speed of the armature.

When the formulae (1-1) and (1-2) are assigned to the formula (2), the following formula (3) is provided:

$$\begin{bmatrix} v_d \\ v_q \end{bmatrix} = \begin{bmatrix} Rs + pL_{dc} + \omega L_{dqc} & -pL_{dqc} - \omega L_{qc} \\ -pL_{dqc} + \omega L_{dc} & Rs + pL_{qc} - \omega L_{dqc} \end{bmatrix} \begin{bmatrix} i_d \\ i_q \end{bmatrix} + \omega\phi \begin{bmatrix} \sin\Delta\theta \\ \cos\Delta\theta \end{bmatrix} \qquad (3)$$

where $L_{dc}$ is provided as $L_{dc}=L_0+L_2 \cos 2\Delta\theta$, and $L_{qc}$ is provided as $L_{qc}=L_0-L_2\cos 2 \Delta\theta$, $L_{dqc}$ is provided as $L_{dqc}=L_2\sin 2 \Delta\theta$, and p is provided as p=d/dt.

When the current $i_{dq}$ is calculated using the formula (3), the following formula (4) is provided:

$$p\begin{bmatrix} i_d \\ i_q \end{bmatrix} = \frac{1}{L_d \cdot L_q}\begin{bmatrix} L_{qc} & L_{dqc} \\ L_{dqc} & L_{dc} \end{bmatrix}\left\{\begin{bmatrix} vd \\ vq \end{bmatrix} - \begin{bmatrix} Rs + \omega L_{dqc} & -\omega L_{qc} \\ \omega L_{dc} & Rs - \omega L_{dqc} \end{bmatrix}\begin{bmatrix} i_d \\ i_q \end{bmatrix} - \omega\phi\begin{bmatrix} \sin\Delta\theta \\ \cos\Delta\theta \end{bmatrix}\right\} \qquad (4)$$

In order to detect a difference between inductances offered by a salient-pole type motor, a d-axis voltage command containing a harmonic, Vd=V sin γt, and a q-axis voltage command Vq=0 are issued. In this case, the second term in the right side of the formula (4) is supposedly unaffected by the harmonic, and the rotor is assumed to be at a standstill. Therefore, the angular speed of the armature ω is 0. The formula (4) is rewritten as follows:

$$p\begin{bmatrix} i_d \\ i_q \end{bmatrix} = \frac{1}{L_d \cdot L_q}\begin{bmatrix} L_{qc} & L_{dqc} \\ L_{dqc} & L_{dc} \end{bmatrix}\begin{bmatrix} V\sin\gamma t \\ 0 \end{bmatrix} \qquad (5)$$

When the deviation Δθ is varied by rotating the dq coordinate system, that is, when an excitation phase is changed from one phase to another, inductances characteristic of a salient-pole type vary. Consequently, the amplitude of a feed back current $i_f$ returned in response to a high-frequency voltage command varies. A change (derivative) $pi_d$ in a d-axis current component of the feed back current $i_f$ is calculated, and multiplied by the high-frequency command voltage $v_d=V \sin \gamma t$. Thereafter, a high-frequency component is removed from the resultant voltage using a low-pass filter, whereby a voltage assuming two peak values is obtained. If $v_d=V \sin \gamma t$ is rewritten as $v_{dh}=V \sin \gamma t$, the following formula is provided:

$$pi_d \cdot v_{dh} = (1/(L_d \cdot L_q))(L_0 - L_2\cos 2\Delta\theta) \cdot V^2 \cdot (\sin\gamma t)^2 \qquad (6)$$
$$= (V^2/(2 \cdot L_d \cdot L_q)) \cdot (L_0 - L_2\cos 2\Delta\theta) \cdot (1 - \cos 2\gamma t)$$

When the high-frequency component cos 2γt is removed using a low-pass filter, the resultant voltage is expressed as follows:

$$f_d = Pi_d \cdot v_{dh} = (V^2/4 \cdot L_d \cdot L_q) \cdot (L_d + L_q - (L_d - L_q) \cdot \cos 2\Delta\theta) \qquad (7)$$

Based on the formula (7), when the deviation Δθ is 0 or π, $f_d$ equals $V^2/(2L_d)$. When the deviation Δθ is π/2 or 3 π/2, $f_d$ equals $V^2/(2L_q)$.

As the IPM motor is of an inverse salient-pole type, the relationship of $L_q>L_d$ is established. Therefore, when the deviation Δθ is 0 or π, the voltage $f_d=pi_d \cdot v_{dh}$ assumes a peak value. Namely, after the derivative $pi_d$ of a d-phase feed back current is multiplied by a high-frequency command voltage, a high-frequency component is removed from the resultant voltage. The voltage assumes two peak values within one cycle of 360°. The peak values are associated with the values 0 and π of the deviation Δθ at which the position of the rotor (magnetic pole) becomes consistent with the d-axis of the dq coordinate system. Therefore, the direction of a magnetic flux is identified by detecting an excitation phase that causes the voltage $f_d$ to assume the peak values. Even when the direction of the magnetic flux is identified, the north and south poles of the magnet cannot be distinguished from each other. At a position at which the deviation Δθ is 0, the direction of a magnetic field produced by a current agrees with the direction of a main magnetic flux φ. This brings about magnetic saturation to reduce the magnetic flux. Eventually, the d-axis inductance $L_d$ decreases, and the d-axis component $i_d$ of a feed back current increases. This phenomenon is utilized in order to discriminate the north pole of the magnet from the south pole thereof.

The d-axis inductance $L_d$ is defined by the following formula (8):

$$L_d = L_d \cdot (1 - k \cdot \cos \Delta\theta) \qquad (8)$$

where k denotes a change rate at which the inductance changes and which is a positive value smaller than 1.

When the formula (8) is assigned to the formula (7), the following formula is provided depending on the deviation Δθ:

if Δθ=0, $f_d=V^2/2L_d \cdot (1-k)$;
if Δθ=π/2, $f_d=V^2/2L_q$;
if Δθ=π, $f_d=V^2/2L_d \cdot (1+k)$; or
if Δθ=3 π/2, $f_d=V^2/2L_q$.

As the relationship $L_q>L_d$ is established, when the deviation Δθ equals 0, $f_d$ assumes a maximum value. Consequently, the position at which the deviation Δθ equals 0 is the true position of the magnetic pole.

Figure 2:
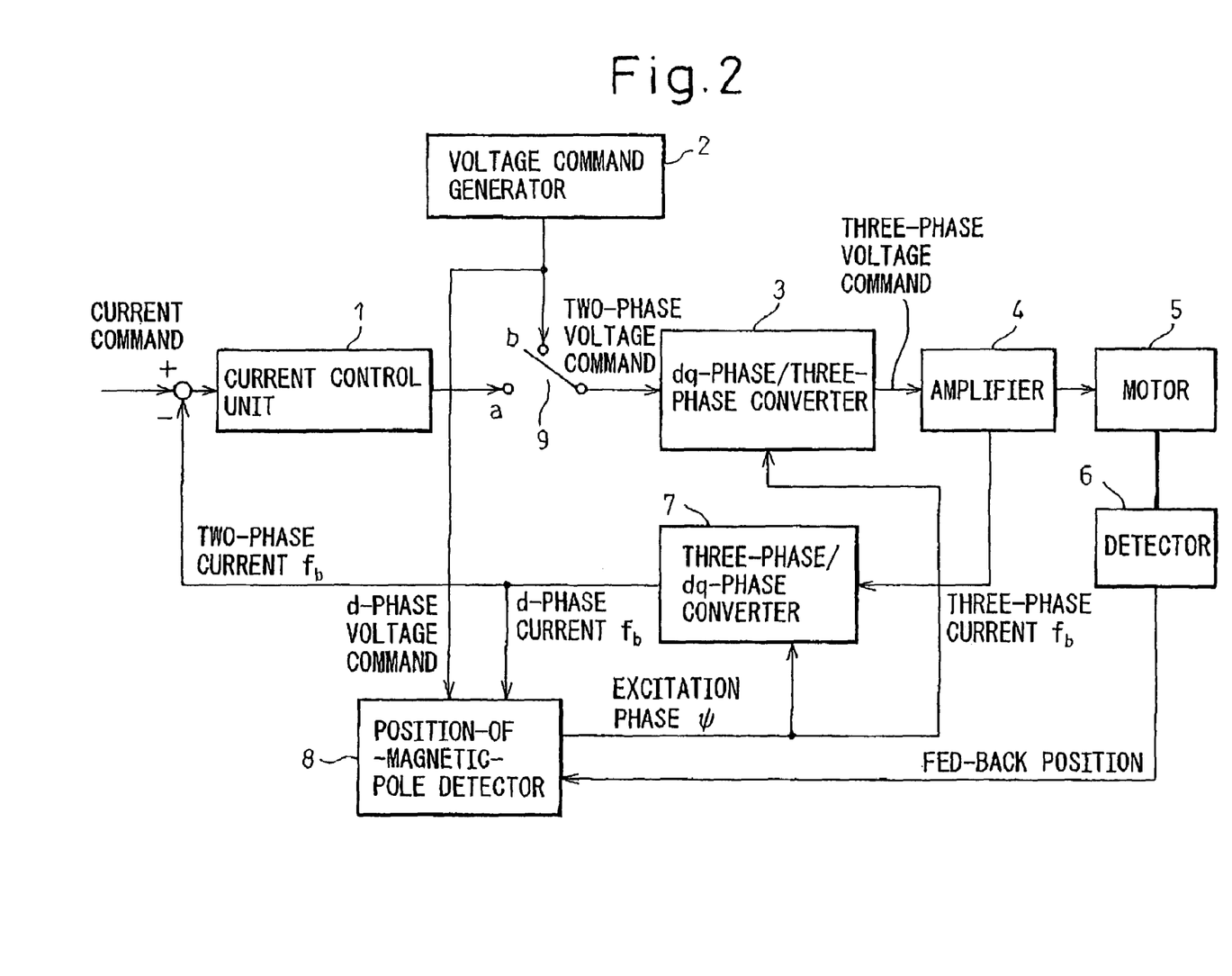
FIG. 2 is a block diagram showing an embodiment of the present invention.

FIG. 2 is a block diagram showing an embodiment of the present invention. For normal driving and control of a motor, a contact a of a switch 9 is made. A converter 7 for converting a three-phase current into a dq-phase current converts three feed back current components of different phases into d-phase and q-phase current components. The d-phase and q-phase feed back currents are subtracted from d-phase and q-phase current components of a current command in order to calculate d-phase and q-phase current deviations. A current control unit 1 performs feedback control on the current command and produces a dq-phase voltage command. Based on the dq-phase voltage command and an excitation phase ψ sent from a position-of-magnetic-pole detector 8, a converter 3 for converting a dq-phase voltage into a three-phase voltage converts the dq-phase voltage command into a three-phase voltage command. Consequently, a motor 5 is driven and controlled via an amplifier 4. The driving and control of the motor 5 has no difference from a conventional motor driving/control method.

The present invention relates to detection of the position of a magnetic pole at the time of starting up a motor or driving the motor for the first time. According to the present embodiment, a voltage command generator 2 is included and the configuration of the position-of-magnetic-pole detector 8 is different from that employed in related arts. In this point, the present invention is different from the related arts.

At the time of starting up the motor, a contact b of the switch 9 is made and the motor is disconnected from a normal control system. The voltage command generator 2 transmits a high-frequency (sine-wave) voltage, of which amplitude is relatively small, as a d-phase voltage command (q-phase voltage command is 0 volt) so as to drive the motor. As the d-phase voltage command is a high-frequency voltage command of small amplitude, a flowing current is so small that the rotor of the motor 5 does not rotate. In this state, the position-of-magnetic-pole detector 8 varies the d-phase voltage command within one cycle of 360° thereof at a predetermined rate at predetermined intervals so as to detect a point within 360° at which a deviation Δθ and an excitation phase ψ become consistent with each other. In other words, the aforesaid dq coordinate system is turned in order to detect an electrical angle consistent with the deviation Δθ. Specifically, a d-phase feed back current $i_d$ is detected at predetermined intervals, and the product of the derivative of the d-phase feed back current by the voltage command sent from the voltage command generator 2 is calculated in order to perform amplitude modulation. A high-frequency component is removed from the resultant voltage, and a maximum value of the excitation phase ψ is detected. A plurality of maximum values is averaged in order to correct a delay. Consequently, the excitation phase ψ consistent with the direction of a magnetic flux is detected. In short, the value of the excitation phase ψ associated with the deviation Δθ of 0 by which the position of the rotor detected by a position detector 6 is deviated, is detected.

Thereafter, the excitation phase ψ is fixed in the direction of the magnetic flux. The voltage command generator causes currents, which are large enough to cause magnetic saturation and assume positive and negative values, to flow. The polarity is determined based on a difference between feed back currents. Thus, the position of a magnetic pole is determined.

Figure 3:
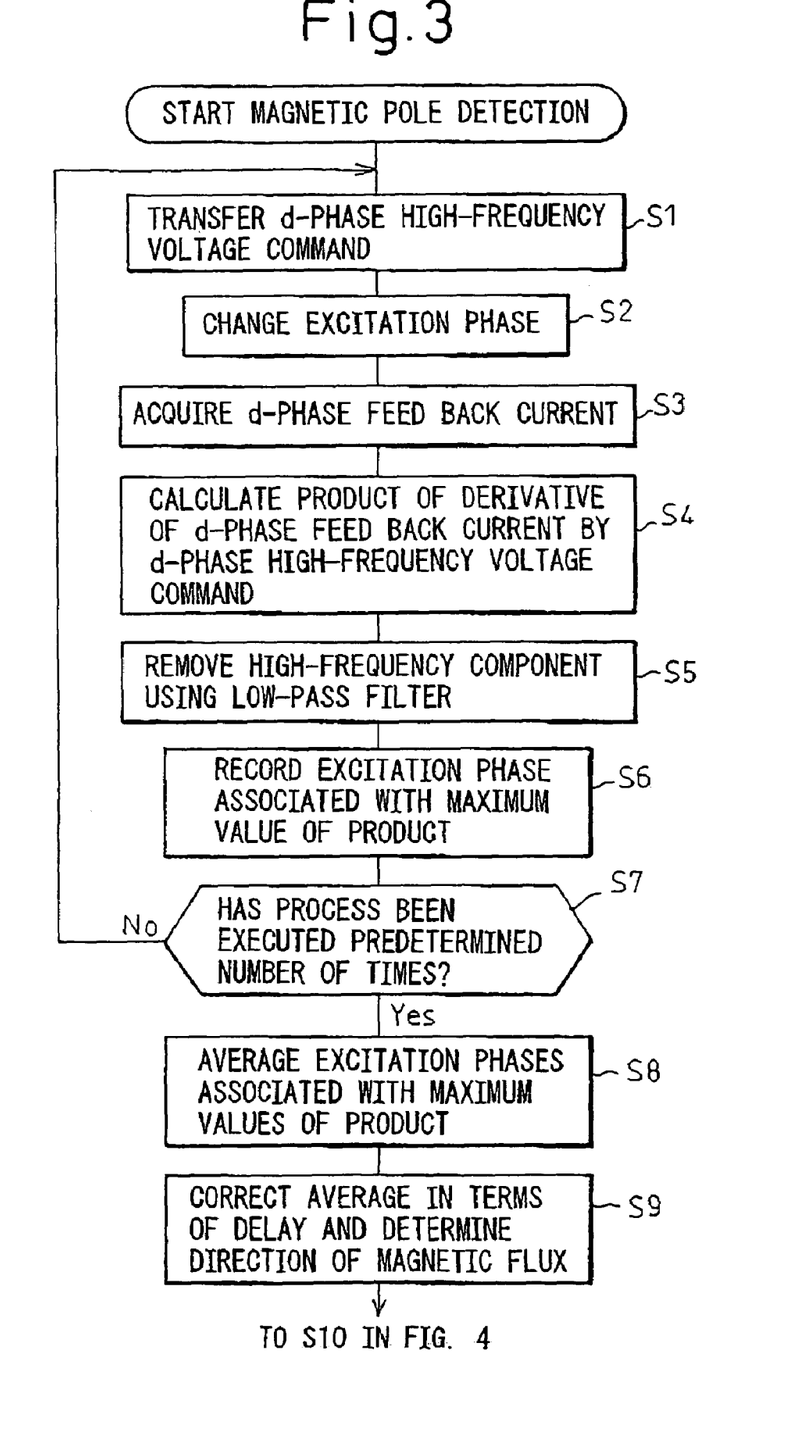
FIG. 3 and FIG. 4 are flowcharts describing an algorithm for detecting a position of excitation which is employed in the embodiment.
Figure 4:
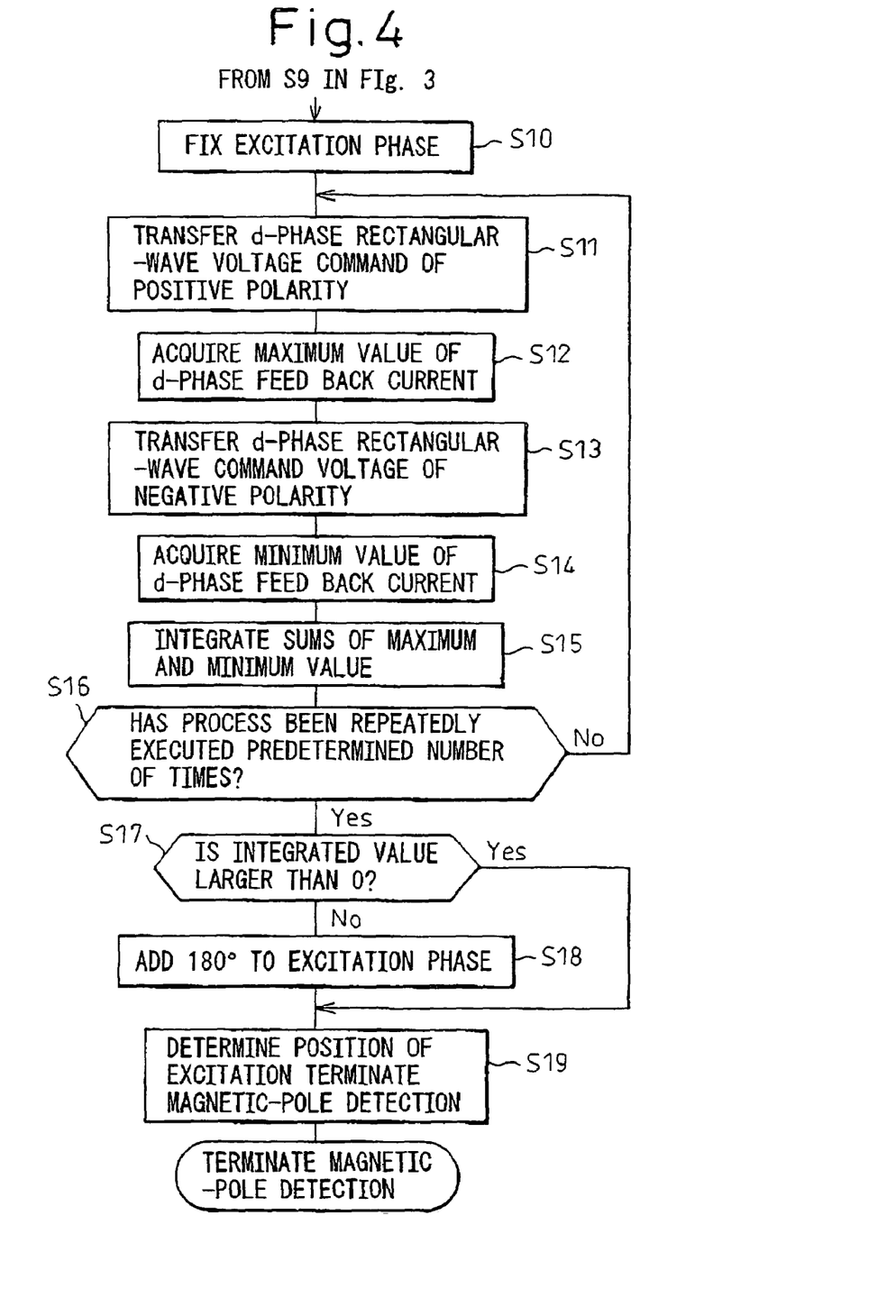

FIG. 3 and FIG. 4 describe an algorithm according to which a control device for controlling a motor acts as the position-of-magnetic-pole detector 8.

Referring to FIG. 3, a high-frequency (sine wave) voltage whose amplitude is relative small and which does not cause the rotor of the motor to move is transferred as a d-phase voltage command, and a q-phase voltage command is set to 0 volt. The motor is then driven (step S1). As the voltage command has a high frequency but a small amplitude, the rotor does not move. An excitation phase ψ is changed to a predetermined degree at predetermined intervals (step S2). A d-phase feed back current is read synchronously with the change in the excitation phase ψ to the predetermined degree (step S3). The derivative $pi_d$ of the d-phase feed back current is calculated based on the difference between the read d-phase feed back current $i_d$ and a d-phase feed back current id read during the previous interval. The product $f_d$ of the derivative $pi_d$ by the high-frequency voltage command transferred at step S1 (see the formula (6)) is calculated (step S4). The product $f_d$ is subjected to low-pass filtering in order to remove a high-frequency component (see the formula (7)) (step S5). The excitation phase ψ associated with a maximum value of the product $f_d$ having the high-frequency component removed therefrom is detected (step S6). Namely, a register is included in order to record the peak values of the product $f_d$ having the high-frequency component removed therefrom. The values recorded in the register are compared with the product $f_d$ calculated at steps S4 and S5. If the calculated product $f_d$ is larger, the calculated product $f_d$ is recorded in the register. The excitation phase ψ associated with the peak value of the product $f_d$ is recorded in the register. The process from step S2 to step S6 is executed at predetermined intervals of an electrical angle of 180°. When the process executed for the electrical angle of 180° is completed, the maximum value of the product $f_d$ attained within one interval of the electrical angle of 180° is detected. Consequently, an excitation phase ψ associated with the maximum value of the product $f_d$ is determined.

Whether the process for one interval of the electrical angle of 180°, into which one cycle of 360° is divided, is executed a predetermined even number of times (for example, eight times in units of 180° or four times in units of 360°) is checked (step S7). If the process has not been executed by the predetermined number of times, the process starting at step S1 is resumed. Thus, the excitation phase ψ associated with the maximum value of the product $f_d$ attained within the electrical angle of 180° is determined relative to each of the predetermined number of times or intervals of 180°. Either of two excitation phases ψ associated with the maximum values of the product $f_d$ attained within one cycle of 360° (for example, a smaller excitation phase ψ) is selected relative to four pairs of determined excitation phases. The selected excitation phases corresponding to electrical angles are averaged, and the average is adopted as the excitation phase ψ associated with the peak value of the product $f_d$ (step S8). The average is corrected in terms of a delay caused by feedback or filtering, whereby the direction of a magnetic flux is determined (step S9). Namely, an excitation phase (direction of a magnetic flux) associated with the deviation Δθ of 0 or π, by which the magnetic pole is deviated from the d-axis, is determined.

Figure 5:
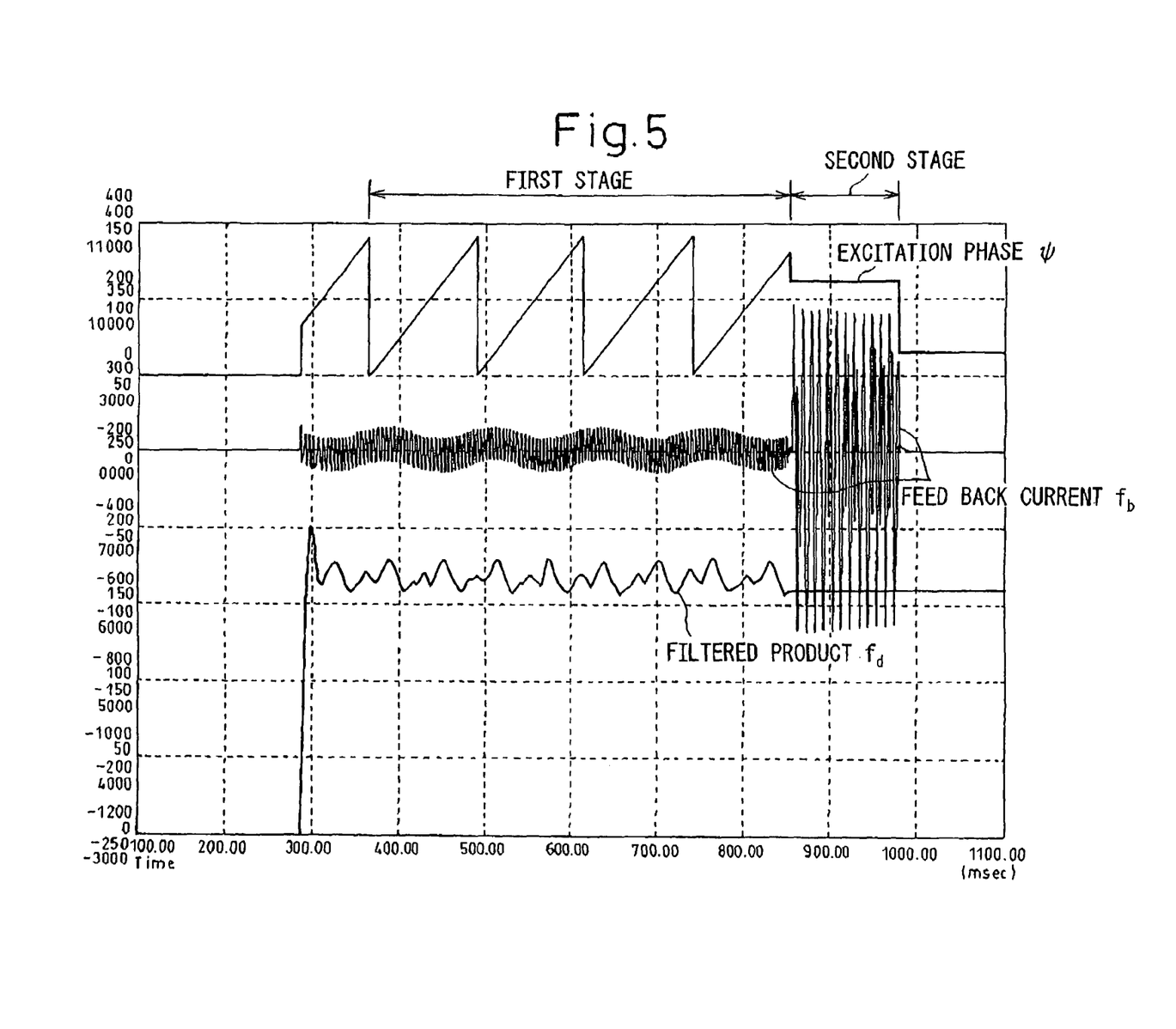
FIG. 5 shows data representing the results of an experiment concerning the embodiment.

FIG. 5 is a graph showing the results of an experiment performed to measure an excitation phase ψ and a feed back current $f_b$ (d-phase feed back current), and to calculate the product $f_d$ of the feed back current by a command voltage. A portion of FIG. 5 indicated as a first stage shows data items produced during a process of determining the direction of a magnetic flux that starts at step S1 and ends at step S9. In FIG. 5, the axis of the abscissa indicates times. A change in an excitation phase ψ is made four times within one cycle of 360°. The axis of ordinates of the graph expressing the excitation phase ψ indicates electrical angles. The amplitude of the feed back current $f_b$ is so small that a driving current is small. The product $f_d$ of the feed back current by the command voltage assumes a peak value twice within one cycle of 360° within which the excitation phase ψ is changed (once per 180°).

Referring back to the flowchart of FIG. 4, the orientation of a magnetic pole is determined based on an excitation phase ψ (direction of a magnetic flux) determined through the process from step S1 to step S9.

First, the excitation phase ψ is fixed to the direction of a magnetic pole determined at step S9 in FIG. 3 (step S10). A positive rectangular-wave voltage having a predetermined cycle is issued as a d-phase voltage command so that a current large enough to cause magnetic saturation will flow through the motor for the purpose of driving the motor (step S11). In this case, as the excitation phase is consistent with the direction of the d-axis, even if the large current flows, the rotor of the motor does not move The peak value (maximum value) of a d-phase feed back current is measured and recorded (step S12). Thereafter, when a predetermined time has elapsed (the voltage command is set to 0 volt), a rectangular-wave voltage of an opposite sign (negative voltage) having the same magnitude is applied as a d-phase voltage command in order to drive the motor (step S13). Even in this case, the rotor of the motor does not rotate. The peak value (minimum value) of the d-phase feed back current is measured and recorded (step S14).

The maximum value and minimum value of the peak values assumed by the d-phase feed back current and measured at step S12 and S14 respectively are added up, and thus obtained sums are integrated (step S15). Whether the calculation has been executed a predetermined number of times is checked. If the calculation has not been executed the predetermined number of times, control is returned to step S11, and the foregoing process started at step S11 is repeatedly executed (step S16). After the peak values (maximum and minimum values) of the d-phase feed back current are measured and added up the predetermined number of times, the resultant sums are integrated. Thereafter, the integrated value is checked to see if it is positive or negative (step S17). If the integrated value is positive, the direction of the excitation phase ψ and the orientation of the magnetic pole are consistent with each other. The current excitation phase ψ is regarded to be consistent with the direction of a main magnetic flux while associated with the deviation Δθ of 0, and determined as a position of excitation (step S19). On the other hand, if the integrated value is negative, the direction of the current excitation phase is opposite to the direction of the main magnetic flux and associated with the deviation Δθ of π. Therefore, 180° is added to the current excitation phase ψ (step S18), and the position of the resultant angle is determined as a position of excitation (step S19).

In the example shown in FIG. 5, a portion of FIG. 5 presented as a second stage shows detection data produced during a process started at step S10. An excitation phase ψ is fixed to a certain electrical angle, and a d-phase feed back current $f_b$ has a much larger amplitude than that in the first stage. In the example shown in FIG. 5, a negative feed back current assumes a larger absolute value. Therefore, in this example, an integrated value calculated by integrating the values of the d-phase feed back current is negative, and a position of excitation is a position indicated with the sum of the fixed excitation phase ψ and 180°.

In the foregoing present embodiment, an excitation phase is changed within one cycle of 360° during the process from step S2 to step S7. Alternatively, the excitation phase may be changed from 0° to 180°. Meantime, the excitation phase associated with a maximum value of the product $f_d$ may be detected.

According to the present invention, the direction of a magnetic flux is detected by applying a high-frequency voltage to a motor while an excitation phase is changed. The excitation phase is fixed to the direction of a magnetic flux, and a rectangular-wave voltage is transferred as a voltage command in order to drive the motor. The polarity of a magnetic pole (an orientation thereof corresponding to the direction of a magnetic flux) is detected in order to detect the position of the magnetic pole. An advantage of the present invention lies in that the position of a magnetic pole can be accurately detected despite the invention having simple actions and simple constituent features.

What is claimed is:

1. A position-of-magnetic-pole detecting device for detecting the position of a magnetic pole at the time of starting up a motor of a salient-pole type, comprising:
    a direction-of-magnetic-pole detecting means for detecting the direction of a magnetic pole on the basis of a feed back current of a driving current flowing through said motor which is returned after a high-frequency voltage is applied to said motor in order to drive said motor while an excitation phase is changed, the high-frequency voltage, and the excitation phase; and
    a polarity-of-magnetic-pole acquiring means for detecting the polarity of a magnetic pole on the basis of the peak values of the feed back currents of positive and negative driving currents flowing through said motor which are returned after positive and negative rectangular-wave voltages are applied to said motor in order to drive said motor with the excitation phase fixed to the direction of a magnetic pole detected by said position-of-magnetic-pole detecting means.

2. A position-of-magnetic-pole detecting device for detecting the position of a magnetic pole at the time of starting up a motor of a salient-pole type, comprising:
    a high-frequency voltage applying means for applying a high-frequency voltage to said motor;
    an excitation phase changing means for changing an excitation phase to an arbitrary phase;
    a driving current detecting means for detecting a feed back current of a driving current, which flows through said motor, after said high-frequency voltage applying means applies a high-frequency voltage to said motor in the direction of the arbitrary phase;
    a direction-of-magnetic-pole detecting means for detecting the direction of a magnetic pole on the basis of the high-frequency voltage applied by said high-frequency voltage applying means, the arbitrary excitation phase, and the feed back current of a driving current detected by said driving current detecting means;
    a rectangular-wave voltage applying means for applying positive and negative rectangular-wave voltages with the excitation phase fixed to the direction of a magnetic pole detected by said direction-of-magnetic-pole detecting means;
    a peak current detecting means for detecting the peak values of the feed back currents of driving currents flowing through said motor which are returned after the positive and negative rectangular-wave voltages are applied; and
    a polarity-of-magnetic-pole acquiring means for detecting the polarity of a magnetic pole on the basis of the feed back currents of positive and negative driving currents.

3. The position-of-magnetic-pole detecting device according to claim 2, wherein said rectangular-wave voltage applying means applies a rectangular wave as a d-phase voltage command.

4. The position-of-magnetic-pole detecting device according to claim 3, wherein: said driving current detecting means converts the feed back current, which is detected while the excitation phase is changed by a predetermined electrical angle, into a dq-phase current, and detects a d-phase current component of the feed back current having been converted into the dq-phase current; and said peak current detecting means converts each of the feed back currents into a dq-phase current, and detects the peak value of a d-phase current component of the feed back current having been converted into the dq-phase current.

5. The position-of-magnetic-pole detecting device according to claim 4, wherein said direction-of-magnetic-pole detecting means detects a plurality of peak values assumed by the product of a derivative of the feed back current of a driving current by the high-frequency voltage, and averages the peak values so as to specify the position of a magnetic pole.

6. The position-of-magnetic-pole detecting device according to claim 5, wherein said polarity-of-magnetic-pole acquiring means integrates each of pluralities of positive and negative peak values detected by said peak current detecting means, and determines the polarity of a magnetic pole on the basis of the integrated values.

7. The position-of-magnetic-pole detecting device according to claim 3, wherein said direction-of-magnetic-pole detecting means detects a plurality of peak values assumed by the product of a derivative of the feed back current of a driving current by the high-frequency voltage, and averages the peak values so as to specify the position of a magnetic pole.

8. The position-of-magnetic-pole detecting device according to claim 7, wherein said polarity-of-magnetic-pole acquiring means integrates each of pluralities of positive and negative peak values detected by said peak current detecting means, and determines the polarity of a magnetic pole on the basis of the integrated values.

9. The position-of-magnetic-pole detecting device according to claim 3, wherein said polarity-of-magnetic-pole acquiring means integrates each of the pluralities of positive and negative peak values detected by said peak current detecting means, and determines the polarity of a magnetic pole on the basis of the integrated values.

10. The position-of-magnetic-pole detecting device according to claim 4, wherein said polarity-of-magnetic-pole acquiring means integrates each of the pluralities of positive and negative peak values detected by said peak current detecting means, and determines the polarity of a magnetic pole on the basis of the integrated values.

11. The position-of-magnetic-pole detecting device according to claim 2, wherein: said driving current detecting means converts the feed back current, which is detected while the excitation phase is changed by a predetermined electrical angle, into a dq-phase current, and detects a d-phase current component of the feed back current having been converted into the dq-phase current; and said peak current detecting means converts each of the feed back currents into a dq-phase current, and detects the peak value of a d-phase current component of the feed back current having been converted into the dq-phase current.

12. The position-of-magnetic-pole detecting device according to claim 11, wherein said direction-of-magnetic-pole detecting means detects a plurality of peak values assumed by the product of a derivative of the feed back current of a driving current by the high-frequency voltage, and averages the peak values so as to specify the position of a magnetic pole.

13. The position-of-magnetic-pole detecting device according to claim 12, wherein said polarity-of-magnetic-pole acquiring means integrates each of the pluralities of positive and negative peak values detected by said peak current detecting means, and determines the polarity of a magnetic pole on the basis of the integrated values.

14. The position-of-magnetic-pole detecting device according to claim 11, wherein said polarity-of-magnetic-pole acquiring means integrates each of the pluralities of positive and negative peak values detected by said peak current detecting means, and determines the polarity of a magnetic pole on the basis of the integrated values.

15. The position-of-magnetic-pole detecting device according to claim 2, wherein said direction-of-magnetic-pole detecting means detects a plurality of peak values assumed by the product of a derivative of the feed back current of a driving current by the high-frequency voltage, and averages the peak values so as to specify the position of a magnetic pole.

16. The position-of-magnetic-pole detecting device according to claim 15, wherein said polarity-of-magnetic-pole acquiring means integrates each of the pluralities of positive and negative peak values detected by said peak current detecting means, and determines the polarity of a magnetic pole on the basis of the integrated values.

17. The position-of-magnetic-pole detecting device according to claim 2, wherein said polarity-of-magnetic-pole acquiring means integrates each of the pluralities of positive and negative peak values detected by said peak current detecting means, and determines the polarity of a magnetic pole on the basis of the integrated values.

18. A position-of-magnetic-pole detecting device for motors of a salient-pole type, comprising:
  a high-frequency voltage applying means for applying a high-frequency voltage to said motor;
  a driving current detecting means for detecting a feed back current of a driving current, which flows through said motor, after said high-frequency voltage applying means applies the high-frequency voltage while an excitation phase is being changed;
  a means for calculating the product of a derivative of the feed back current of a driving current, which is detected by said driving current detecting means, by the high-frequency voltage;
  a filter means for removing a high-frequency component from the product of the derivative of the feed back current of a driving current by the high-frequency voltage;
  a direction-of-magnetic-pole detecting means for detecting the direction of a magnetic pole by acquiring, from an output of said filter means, a peak value assumed by the product of the derivative of the feed back current of a driving current by the high-frequency voltage;
  a rectangular-wave voltage applying means for driving said motor by applying positive and negative rectangular-wave voltages, which have a magnitude causing magnetic saturation, with the excitation phase fixed to the direction of a magnetic pole detected by said direction-of-magnetic-pole detecting means;
  a peak current detecting means for detecting the peak values of the feed back currents of driving currents returned when the positive and negative rectangular-wave voltages are applied in order to drive said motor; and
  a polarity-of-magnetic-pole acquiring means for detecting the polarity of a magnetic pole according to the values of the feed back currents of positive and negative driving currents.

19. The position-of-magnetic-pole detecting device according to claim 18, wherein said rectangular-wave voltage applying means applies a rectangular wave as a d-phase voltage command.

20. The position-of-magnetic-pole detecting device according to claim 19, wherein: said driving current detecting means converts the feed back current, which is detected while the excitation phase is changed by a predetermined electrical angle, into a dq-phase current, and detects a d-phase current component of the feed back current having been converted into the dq-phase current; and said peak current detecting means converts each of the feed back currents into a dq-phase current, and detects the peak value of a d-phase current component of the feed back current having been converted into the dq-phase current.

21. The position-of-magnetic-pole detecting device according to claim 20, wherein said direction-of-magnetic-pole detecting means detects a plurality of peak values assumed by the product of a derivative of the feed back current of a driving current by the high-frequency voltage, and averages the peak values so as to specify the position of a magnetic pole.

22. The position-of-magnetic-pole detecting device according to claim 21, wherein said polarity-of-magnetic-pole acquiring means integrates each of the pluralities of positive and negative peak values detected by said peak current detecting means, and determines the polarity of a magnetic pole on the basis of the integrated values.

23. The position-of-magnetic-pole detecting device according to claim 19, wherein said direction-of-magnetic-pole detecting means detects a plurality of peak values assumed by the product of a derivative of the feed back current of a driving current by the high-frequency voltage, and averages the peak values so as to specify the position of a magnetic pole.

24. The position-of-magnetic-pole detecting device according to claim 23, wherein said polarity-of-magnetic-pole acquiring means integrates each of the pluralities of positive and negative peak values detected by said peak current detecting means, and determines the polarity of a magnetic pole on the basis of the integrated values.

25. The position-of-magnetic-pole detecting device according to claim 19, wherein said polarity-of-magnetic-pole acquiring means integrates each of pluralities of positive and negative peak values detected by said peak current detecting means, and determines the polarity of a magnetic pole on the basis of the integrated values.

26. The position-of-magnetic-pole detecting device according to claim 20, wherein said polarity-of-magnetic-pole acquiring means integrates each of pluralities of positive and negative peak values detected by said peak current detecting means, and determines the polarity of a magnetic pole on the basis of the integrated values.

27. The position-of-magnetic-pole detecting device according to claim 18, wherein: said driving current detecting means converts the feed back current, which is detected while the excitation phase is changed by a predetermined electrical angle, into a dq-phase current, and detects a d-phase current component of the feed back current having been converted into the dq-phase current; and said peak current detecting means converts each of the feed back currents into a dq-phase current, and detects the peak value of a d-phase current component of the feed back current having been converted into the dq-phase current.

28. The position-of-magnetic-pole detecting device according to claim 27, wherein said direction-of-magnetic-pole detecting means detects a plurality of peak values assumed by the product of a derivative of the feed back current of a driving current by the high-frequency voltage, and averages the peak values so as to specify the position of a magnetic pole.

29. The position-of-magnetic-pole detecting device according to claim 28, wherein said polarity-of-magnetic-pole acquiring means integrates each of pluralities of positive and negative peak values detected by said peak current detecting means, and determines the polarity of a magnetic pole on the basis of the integrated values.

30. The position-of-magnetic-pole detecting device according to claim 27, wherein said polarity-of-magnetic-pole acquiring means integrates each of the pluralities of positive and negative peak values detected by said peak current detecting means, and determines the polarity of a magnetic pole on the basis of the integrated values.

31. The position-of-magnetic-pole detecting device according to claim 18, wherein said direction-of-magnetic-pole detecting means detects a plurality of peak values assumed by the product of a derivative of the feed back current of a driving current by the high-frequency voltage, and averages the peak values so as to specify the position of a magnetic pole.

32. The position-of-magnetic-pole detecting device according to claim 31, wherein said polarity-of-magnetic-pole acquiring means integrates each of pluralities of positive and negative peak values detected by said peak current detecting means, and determines the polarity of a magnetic pole on the basis of the integrated values.

33. The position-of-magnetic-pole detecting device according to claim 18, wherein said polarity-of-magnetic-pole acquiring means integrates each of pluralities of positive and negative peak values detected by said peak current detecting means, and determines the polarity of a magnetic pole on the basis of the integrated values.

34. A position-of-magnetic-pole detecting method for rotors of a salient-pole type, comprising the steps of:
- applying a high-frequency voltage to said motor while changing an excitation phase, and detecting a feed back current of a driving current flowing through said motor;
- calculating the product of a derivative of the detected feed back current of a driving current by the high-frequency voltage;
- removing a high-frequency component from the product using a filter;
- detecting the direction of a magnetic pole according to a peak value that is assumed by the product of the derivative of the feed back current of a driving current by the high-frequency voltage and that is acquired by removing the high-frequency component;
- detecting the peak values of the feed back currents of driving currents returned after positive and negative rectangular-wave voltages that have a magnitude causing magnetic saturation are applied in order to drive said motor with the excitation phase fixed to the detected direction of a magnetic pole; and
- detecting the polarity of a magnetic pole according to the peak values of the feed back currents of positive and negative driving currents.

* * * * *